United States Patent [19]
Winchester et al.

[11] Patent Number: 5,458,320
[45] Date of Patent: Oct. 17, 1995

[54] ACCRETION CONTROLLING TUYERE

[75] Inventors: David C. Winchester, Allentown; Larry K. Farmer, Fleetwood; Michael D. Lanyi, Macungie; Charles E. Baukal, Jr., Harleysville, all of Pa.

[73] Assignee: Gas Research Institute, Chicago, Ill.

[21] Appl. No.: 285,455

[22] Filed: Aug. 3, 1994

Related U.S. Application Data

[62] Division of Ser. No. 124,897, Sep. 21, 1993.

[51] Int. Cl.$^6$ .................................................. C21C 5/48
[52] U.S. Cl. ................. 266/222; 266/268; 266/270
[58] Field of Search .................... 266/47, 222, 268, 266/270

[56] References Cited

U.S. PATENT DOCUMENTS 4,249,719  2/1981  Knuppel et al. .................. 266/222

FOREIGN PATENT DOCUMENTS 1008213  1/1989  Japan ..................................... 75/530
5214420  8/1993  Japan ..................................... 75/530

*Primary Examiner*—Melvyn Andrews
*Attorney, Agent, or Firm*—James C. Simmons

[57] ABSTRACT

A tuyere for refining molten metals or melting metal scrap or oxides charged into a vessel. The tuyere comprises three concentric pipes of copper or stainless steel encased in refractory. An annular stream of natural gas surrounds an annular stream of oxygen which in turn surrounds a core stream of natural gas. All three streams are expanded as they flow through the tuyere and as a result an accretion forms at the tip of the tuyere. The accretion protects the tuyere and the gas streams are controlled so that the accretion is maintained at a desired size which neither blocks the tuyere, nor permits burnback of the pipes.

2 Claims, 1 Drawing Sheet

ACCRETION CONTROLLING TUYERE

This application is a division of application Ser. No. 08/124,897 filed Sep. 21, 1993.

FIELD OF THE INVENTION

This invention relates to injection of inert and/or reactive gases into a bath of molten metal by means of a submerged tuyere.

BACKGROUND OF THE INVENTION

Concentric pipe tuyeres, have been applied and are used widely throughout the metals industry. An early patent on such a tuyere was French Patent 1,450,718, which described two concentric pipes to produce a core jet of oxygen surrounded by an annular jet of cooling gas. Since then, a large number of improvements have been made using either two concentric pipes as in French patent or two or more than two concentric pipes as shown in the following U.S. Pat. Nos.

| | | |
|---|---|---|
| 2,855,293 | 3,893,658 | 4,272,286 |
| 3,706,549 | 3,897,048 | 4,336,064 |
| 3,832,161 | 4,022,447 | 4,450,005 |
| 3,891,492 | 4,138,098 | 4,754,951 |
| | 4,249,719 | 4,887,800 |

In order to operate satisfactorily any tuyere for injecting fuel gas and oxygen into a molten metal bath, the tuyere must be operated within very narrow limits. If the temperature is allowed to increase too much the tuyere pipes melt or burn away and the tuyere fails in a short time. If the temperature is too low, a solid accretion forms at the tip of the tuyere and the tuyere becomes blocked, the flow of gas out of the tuyere ceases and the gas is forced into the refractory surrounding the tuyere, with destruction of the refractory and failure of the tuyere.

In order to operate satisfactorily for extended periods of time, a tuyere for injecting fuel gas and oxygen into molten metals must remain cool, open, and must be protected by a thermal accretion of the correct size. Additionally, it must be constructed of materials that are compatible with the reactants at the operating temperatures, pressures, and velocities.

SUMMARY OF THE INVENTION

This invention relates to a specifically designed tuyere, or gas injector, which is useful in simultaneously injecting relatively large flows of oxygen and natural gas in varying ratios with a broad "turn-down" into molten metal without causing the formation of excessively large accretions which can cause back pressure build-ups and gas leakage back through the refractory lining of a vessel for melting or refining molten metal, especially molten ferrous metal.

More particularly, it relates to a tuyere comprised of three concentric pipes or tubes, through which streams of oxygen and natural gas are introduced into a molten metal bath, such as pig iron, the oxygen stream being an inner annulus disposed between an outer annulus of natural gas and an inner core of natural gas, the lengths and diameters of the center tube and oxygen tube are selected so that the ratio of the fully expanded center tube jet velocity to the fully expanded oxygen annulus jet velocity ranges from 0.8 to 1.4 and the length and diameter of the outer tube is selected such that the ratio of the fully expanded outer annulus jet velocity to the fully expanded inner annulus jet velocity ranges from 1.0 to 1.6.

According to the invention means are provided to simultaneously inject relatively large quantities of oxygen and natural gas into a molten metal bath, in varying ratios, while avoiding the previously experienced operating problem of too large an accretion build-up on the end of the tuyere (gas injector).

The invention provides a tuyere design and operation which produces formation of a properly-sized protective accretion over the end of the tuyere when gases (e.g. oxygen, natural gas) are injected into molten ferrous melts.

DETAILED DESCRIPTION OF THE INVENTION

Figure 1:
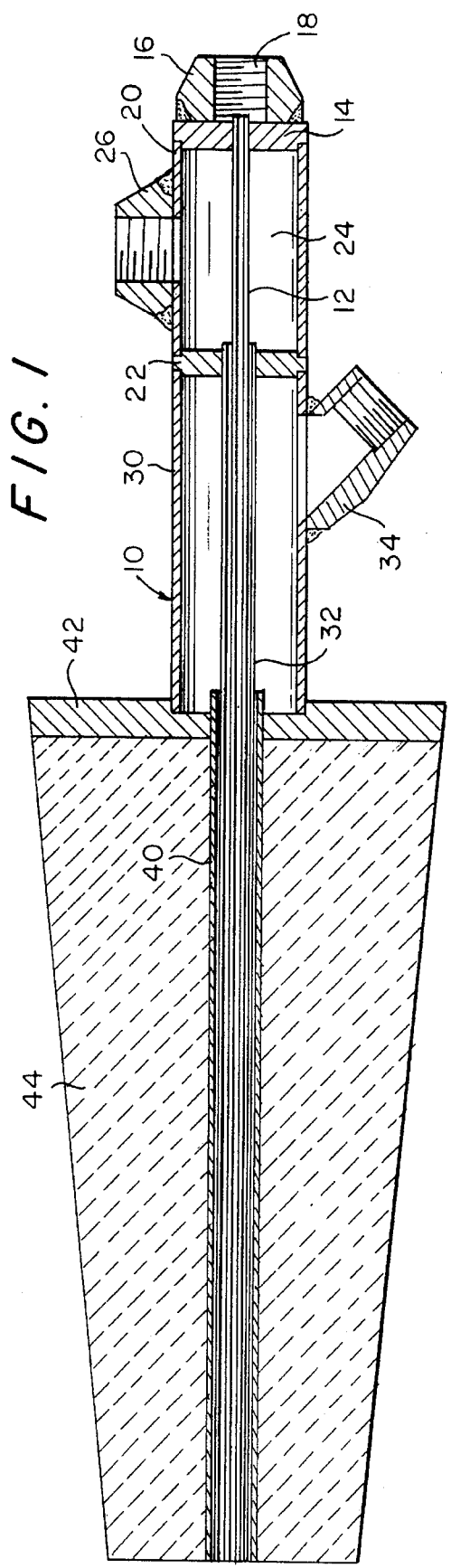
FIG. 1 is a sectional view taken through the center of the tuyere.
Figure 3:
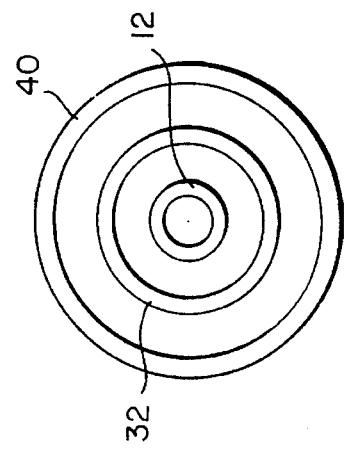
FIG. 3 is an enlarged sectional view of the tuyere of FIG. 1.

The tuyere of the present invention is an injector for the simultaneous introduction of fuel gas (natural gas, carbon monoxide, hydrogen, propane or any hydrocarbon gas) and oxygen into solid steel scrap, molten pig iron, molten steel, molten oxides (glass or refractories), solid non-ferrous metal scrap, or molten non-ferrous metals. The tuyere can be used to inject fuel gas and oxygen with broad turndown and at various flow rate ratios for the purpose of heating, melting, reducing, or oxidizing the metal or, oxide. It is designed to resist blockage by frozen metal or oxide, remain cool, and control the formation of thermal accretions while injecting the reactant streams into the metal or oxide.

The tuyere of this invention is made up of three concentric metal (copper and stainless steel) tubes open on one end and connected to individual plenum chambers on their other ends as shown in the drawings. This arrangement creates two annular passages that surround a central core. Fuel gas enters the tuyere and flows through plenum chamber to the outer annulus and the core tube. Oxygen enters the tuyere and flows through a plenum to the inner annulus. Oxygen and fuel gas are injected into the molten metal or oxide from the open ends of the tubes. The tuyere is encased in a refractory brick that is set into the wall of the converter vessel or furnace that contains the metal or oxide. The lengths and diameters of the center and first annulus tubes are selected so that the ratio of the fully expanded center tube jet velocity to the fully expanded first annulus jet velocity ranges from 0.8 to 1.4. The length and diameter of the outer annulus tube is selected such that the ratio of the fully expanded outer annulus jet velocity to the fully expanded inner annulus jet velocity ranges from 1 to 1.6.

The tuyere is cooled by convective heat exchange between the expanding gases and tube walls and in some cases, by the endothermic cracking of the fuel gas. Blockage is prevented by the high speed (supersonic), underexpanded gas jets that are created on the open ends of the tubes. The size of thermal accretions on the end of the tuyere are controlled by varying the distribution of natural gas between the core and the outer annulus and by setting the amount of mixing between the oxygen and fuel streams.

The tuyere of this invention is characterized by the expansion of the fuel and oxygen streams as they flow from plenum chambers to the open ends of the concentric tubes. The gases enter the tuyere at pressures from 200 to 500 PSIG and expand to the static pressure of the molten bath or scrap charge (typically from 0 to 15 PSIG) at the exit of the tuyere. As the gases flow from the plenum chambers at the back of the tuyere to the exit at the front end of the tuyere, they expand and accelerate. The gas velocities at the plenum end of the tubes are low, approximately up to 10 ft/sec, while those at the tuyere exit are Mach 1 or "choked". The gases are not fully expanded at the tuyere exit and continue to expand to the bath pressure outside the tuyere exit. In this final expansion, the gases accelerate to supersonic velocities between Mach 1 and Mach 3.

As the fuel and oxygen accelerate inside the tuyere, enthalpy and heat are converted into the kinetic energy of the gas streams. The high ratios (30:1–6:1) of gas inlet pressures to outlet pressures cause the gases to accelerate and allow them to convert heat transferred from the tube walls to kinetic energy (thereby cooling the tube surface). Heat is transferred from the tube wall to the gas flows by convection. The convective heat transfer coefficient is high because of the high Reynolds number (turbulence) of the flows. Since the Reynolds number and Prandtl number are constant along the length of the tubes, the heat transfer coefficient also remains constant. Cooling is so effective with this design that the metal tubes stay below 500° F. even though surrounded by refractory at 1000°–3000° F.

Tuyeres frequently fail because of blockage by molten metal or oxide that runs into or floods the tuyere tubes and freezes. We have found that flooding can be prevented by running the fuel gas and oxygen at high enough pressure ratios to create an underexpanded supersonic gas jet in the molten metal or oxide at the end of the tuyere.

The static pressure inside the jet and at the tuyere exit is greater than the static pressure of the molten metal or oxide. This jet static pressure prevents liquid from flowing back into the tuyere outlet. At pressures below those required for an underexpanded jet, periodic bubbling flow results and allows molten metal contact with and flow back into the tuyere exit.

The diameter and lengths of the tubes used in the tuyere of this invention are selected to create supersonic jets with fully expanded Mach numbers between 1.1 and 3. Standard gas dynamics correlations (Fanno and Rayleigh flow) for high speed flow in a constant area duct were used to calculate the required tube diameters for a given flow rate and pressure ratio. These correlations were qualified with extensive data collected in actual operation of the tuyere. The tuyere tubes can be any combination of length and diameter that creates a supersonic jet on the end of the tuyere for the desired flow and pressure ratio.

Of course the tuyere must be constructed of materials, preferably stainless steel or copper, of sufficient thickness to withstand the internal pressures at the maximum operating temperatures.

Figure 2:
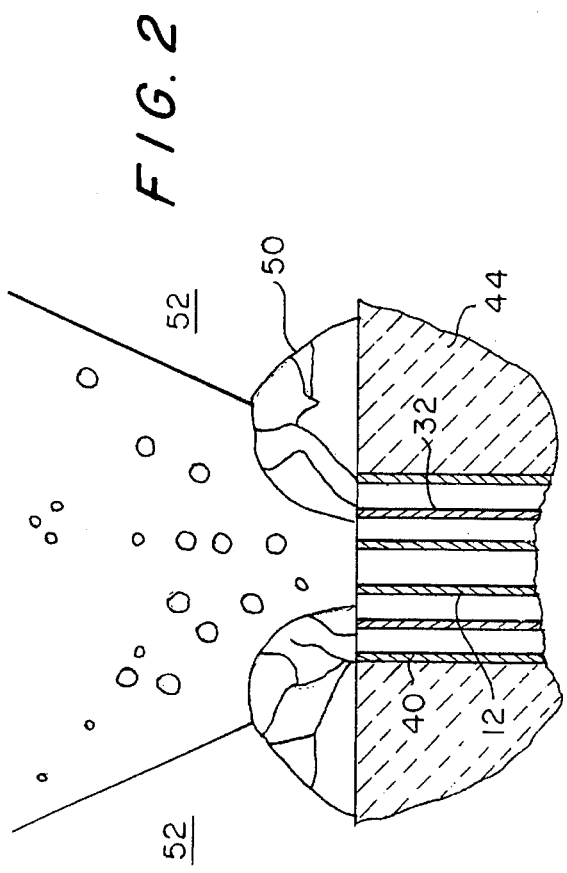
FIG. 2 is an enlarged schematic view of the tip of the tuyere of FIG. 1 showing an accretion at the tip of the tuyere.

High speed underexpanded gas jets will prevent blockage of the tuyere due to molten metal or oxide flow into the passages but will not prevent the formation of a frozen metal or oxide accretion over the end of the tuyere. A typical accretion is shown in FIG. 2 and is a mass of metal or oxide that is cooled to its freezing point by the endothermic decomposition of a portion of the fuel gas stream. Accretions are porous enough to allow gas flow and will shield the end of the tuyere from superheated molten metal or oxide. If an accretion is allowed to grow too large, it will restrict gas flow and force gases through the vessel refractories. These gases will work their way through the vessel wall to the outside where they will burn. If trapped in the refractories, the combustible oxygen and fuel gas could create an explosion.

The size of the accretion that builds on the end of a gas injection tuyere can be calculated by performing a heat balance. For a given steady sized accretion the heat input must equal the heat that leaves the accretion. The accretion will grow if it experiences a net cooling effect or it will diminish in size if it experiences a net heating effect. One method of computation for a two pipe tuyere is set forth in a paper given at the "Savard Lee International Symposium on Bath Smelting" in Montreal Oct. 18–22, 1992 entitled "On The Formation Of Thermal Accretions (Mushrooms) in Steelmaking Vessels" by Guthrie, Lee and Sahai. Similar calculations can be made for the three pipe tuyere of the present invention.

Heat is transferred to or from the accretion in the following four ways:

1. To the accretion from the surrounding molten metal by convection.

2. To the accretion from the combustion of a portion of the fuel gas stream.

3. From the accretion to endothermic decomposition of the unburned portion of the fuel gas.

4. From the accretion to heating the natural gas and oxygen streams to the freezing temperature of the molten metal.

It has been found that as the natural gas flow rate is increased, the fraction of unburned natural gas must be decreased to maintain an accretion of constant size.

It has been calculated that for methane-oxygen injection into steel, 10 to 25% of the natural gas must be burned close to the exit of the tuyere to control the size of the accretion. If all of the natural gas is unburned then accretions will become excessively large. On the other hand if 30% or more of the natural gas is burned close to the end of the tuyere then the accretions will become too small and the end of the tuyere will not be protected.

The amount of natural gas that reacts with oxygen exiting the end of the tuyere is dependent on the amount of mixing between the streams. The tuyere of this invention creates a central jet of natural gas that is surrounded by two concentric annular jets. The core natural gas jet is surrounded by an annular oxygen jet that is in turn surrounded by an annular natural gas jet. The rate of mixing between concentric jets depends on the ratio of their fully expanded velocities. The lengths and diameters of the center and inner annulus tubes used in this invention are chosen so that the ratio of the fully expanded core velocity to the fully expanded inner annulus velocity ranged from 0.8 to 1.4.

The length and diameter of the outer annulus tube are chosen so that the ratio of the fully expanded outer annulus velocity to the inner annulus velocity ranged from 1 to 1.6.

The range of velocity ratios given above successfully control the amount of mixing between the natural gas and oxygen jets and hence the amount of combustion close to the exit of the tuyere. These ratios keep the fraction of unburned natural gas above 75% for oxygen to fuel ratios between 2 and 1.

Mixing between natural gas and oxygen is further controlled by distribution of the natural gas between the core jet and outer annular jet. In accordance with this invention 10 to 50% of the natural gas is supplied through the outer annulus. In a preferred operation 10% of the natural gas is supplied to the outer annulus and 90% to the core. All of the oxygen is supplied through the inner annulus. The tuyere has been successfully operated at overall oxygen flow to natural gas flow ratios of 0.8 to 2.5.

The tuyere of this invention can also be used to inject fuel gas and oxygen into solid metal scrap. The scrap mixes the reactants and stabilizes a flame in the voids between the scrap. With this capability, this invention can be used to preheat scrap metal to its melting temperature and subsequently inject reactant gases (oxygen and fuel) into the molten metal bath.

FIG. 1 illustrates the tuyere 10 of this invention. A central pipe 12 preferably of copper is fastened by welding, brazing or soldering to a collar 14 to which a nipple 16 is secured, by welding, brazing or soldering. Utilizing threaded passage 11, nipple 16 is connected to a supply of natural gas (not shown) which forms the core of the stream exiting the end of the tuyere. A section of pipe 20 extends from collar 14 to a collar 22. The space between collars 14 and 22 defines an oxygen plenum space 24 which is connected to a supply of oxygen through a fitting 26, welded to pipe 20. An opening is provided in the wall of pipe 20 where fitting 26 is welded to pipe 20. Collar 14 supports the central pipe 12.

Supported by and extending from a shoulder on collar 22 is a stainless steel pipe section 30 in which an oxygen supply pipe 32 is disposed, extending from collar 22 to the tip of the tuyere. A fitting 34 welded to pipe 30 connecting pipe 30 with a supply of natural gas, (not shown). Pipe 30 defines a natural gas plenum which supplies natural gas to a third concentric gas supply pipe 40.

Gas supply pipe 40 is mounted in a support plate 42. Pipe 40 is concentric with and surrounds pipes 12 and 32. Pipe 40 is encased in a protective refractory 44.

Tuyere 10 is installed in a refining vessel, e.g. as shown in any of the above noted U.S. patents and when in use, with oxygen and natural gas flowing through pipes 32, 12 and 40, an accretion 50 builds up at the end of the tuyere as shown in FIG. 2. Accretion 50 is in the molten metal 52.

By suitably proportioning the dimensions (length and diameter) of tubes 12, 32 and 40 and by providing appropriate gas flows through the pipes the accretion 50 remains at an optimum size and then does not get any larger or smaller.

Examples 1 and 2 below were experiments conducted according to the teaching of the present invention.

| Example #1 | | | | |
|---|---|---|---|---|
| Trial Date: 3 November 1988 | | Location: Greenville, PA | | |
| Vessel: Universal Refining Vessel | | | | |
| Molten Steel Weight: 6.5 Tons | | Steel Composition: 0.22 C 0.53 Mn 0.01 Si | | |
| Tuyere Dimensions | | | | |
| Tubes | I.D. (in.) | O.D. (in.) | Length (in.) | |
| Core | 0.186 | 0.250 | 15.0 | |
| Inner Annulus | 0.302 | 0.540 | 11.0 | |
| Outer Annulus | — | — | — | |
| Gas Injection Parameters | | | | |

-continued

| Example #1 | | | | |
|---|---|---|---|---|
| | Gas | Flowrate (SCFM) | Velocity (ft/sec) | Mach. No. |
| Core | $O_2$ | 166 | 2940 | 2.7 |
| Inner Annulus (A1) | N.G. | 83 | 3990 | 2.2 |
| Outer Annulus (A2) | — | — | — | — |
| Gas Passage Velocity Ratios: | | | | |

$V_{core}/V_{A1}$: 0.74    $V_{A2}/V_{A1}$: —

Accretion Formation:

Size: 12" dia.
Shape: Dome Covering Entire Tuyere
Result:  Gas flow blocked, resulting in leakage through the refractory and subsequent external flames.

| Example #2 | | | |
|---|---|---|---|
| Trial Date: 18 January 1990 | | Location: Bethlehem, PA | |
| Vessel: Mini-BOF | | | |
| Molten Steel Weight: 2.0 Tons | | Steel Composition: 3.9 C 0.74 Mn 0.72 Si | |
| Tuyere Dimensions | | | |
| Tubes | I.D. (in.) | O.D. (in.) | Length (in.) |
| Core | 0.124 | 0.188 | 28.6 |
| Inner Annulus | 0.256 | 0.375 | 24.0 |
| Outer Annulus | 0.388 | 0.540 | 8.0 |
| Gas Injection Parameters | | | |
| | Gas | Flowrate (SCFM) | Velocity (ft/sec) | Mach. No. |
| Core | N.G. | 34 | 2840 | 1.9 |
| Inner Annulus (A1) | $O_2$ | 97 | 2450 | 2.2 |
| Outer Annulus (A2) | N.G. | 16 | 3410 | 1.8 |
| Gas Passage Velocity Ratios: | | | | |

$V_{core}/V_{A1}$: 1.16    $V_{A2}/V_{A1}$: 1.39

Accretion Formation:

Size: 2" dia.
Shape: Toroid Around Outside of Tuyere
Result:  Tuyere operated as designed with little or no wear and no gas leakage.

From the foregoing examples it can be shown that a tuyere and method of operation according to the present invention (Example 2) overcomes the problems with prior art devices simulated by Example 1.

Having now described the preferred embodiment of our invention, it is not intended that it be limited except as may be required by the appended claims:

We claim:

1. A tuyere for introducing oxygen and a fuel gas into a vessel for preheating, melting or refining metals, metal alloys, metallic and non-metallic oxides which comprises three concentric tubes, a central tube through which a core jet of fuel gas flows into the vessel, an intermediate tube spaced from and surrounding the central tube, the space between said central and intermediate tubes defining an inner annulus through which an annular jet of oxygen is introduced into said vessel and an outermost tube spaced from said intermediate tube, the space between said intermediate and outermost tubes defining an outer annulus through which an annular jet of fuel gas is introduced into said vessel, the lengths and diameters of the central tube and intermediate tube are selected so that the ratio of the fully expanded core jet velocity to the fully expanded oxygen annulus jet velocity ranges from 0.8 to 1.4 and the length and diameter of the outermost tube is selected so that the ratio of the fully expanded outer annulus jet velocity to the inner annulus fully expanded jet velocity ranges from 1.0 to 1.6.

2. The tuyere of claim 1 wherein the tubes are of copper or stainless steel.

* * * * *